United States Patent [19]

Bengeser et al.

[11] Patent Number: 4,478,799
[45] Date of Patent: Oct. 23, 1984

[54] CONTROL OF CARBON MONOXIDE PARTIAL PRESSURE IN SOUR GAS ABSORPTION SYSTEM

[75] Inventors: Georg Bengeser, Deining; Gerhard Ranke, Poecking, both of Fed. Rep. of Germany

[73] Assignee: Linde Aktiengesellschaft, Wiesbaden, Fed. Rep. of Germany

[21] Appl. No.: 447,821

[22] Filed: Dec. 8, 1982

[30] Foreign Application Priority Data

Dec. 8, 1981 [DE] Fed. Rep. of Germany ....... 3148520

[51] Int. Cl.³ ...................... B01D 53/34; C01B 17/04
[52] U.S. Cl. ........................................ 423/224; 55/72; 55/73; 423/226
[58] Field of Search ...................... 55/72, 73; 423/224, 423/226

[56] References Cited

U.S. PATENT DOCUMENTS

| | | | |
|---|---|---|---|
| 3,688,474 | 9/1972 | Head et al. | 55/72 |
| 4,097,250 | 6/1978 | Pagani et al. | 55/73 |
| 4,142,875 | 3/1979 | Bohmholdt et al. | 55/72 |
| 4,144,314 | 3/1979 | Doerges et al. | 55/73 |
| 4,155,988 | 5/1979 | Karwat et al. | 55/73 |
| 4,332,598 | 6/1982 | Antonas et al. | 55/73 |
| 4,345,918 | 8/1982 | Meissner | 55/73 |
| 4,348,368 | 9/1982 | Blytas et al. | 423/224 |
| 4,371,381 | 2/1983 | Schuftan | 55/73 |

FOREIGN PATENT DOCUMENTS 2912115 10/1980 Fed. Rep. of Germany .......... 55/73

OTHER PUBLICATIONS

Ranke, Gerhard, "Advantages of the Rectisol-Wash Process in Selective H₂S Removal from Gas Mixtures", Linde Reports on Science and Technology, 18/1973, pp. 7-13.

Primary Examiner—R. L. Andrews
Assistant Examiner—Terryence Chapman
Attorney, Agent, or Firm—Millen & White

[57] ABSTRACT

In the removal of sour gases, $H_2S$ in particular, from CO-containing gaseous mixtures containing heavy metal carbonyls by scrubbing under pressure at temperatures of below 0° C. with a scrubbing medium, the scrubbing medium is regenerated by inter alia, being heated by means of heat exchangers, and such exchangers are normally fouled by precipitates of metal sulfides which owe their presence to the decomposition of the metal carbonyls to form reactive heavy metal which combines with sulfide ion. To avoid fouling of the heat exchangers, the CO partial pressure is increased during the heating of the loaded scrubbing medium, to above the partial pressure of the CO in equilibrium with the carbonyls in the scrubbing medium thereby preventing the decomposition of the carbonyls.

12 Claims, 3 Drawing Figures

CONTROL OF CARBON MONOXIDE PARTIAL PRESSURE IN SOUR GAS ABSORPTION SYSTEM

BACKGROUND OF THE INVENTION

This invention relates to a process for the removal of $H_2S$-containing sour gases from gaseous mixtures containing carbon monoxide and at least one heavy metal carbonyl, and in particular to a process comprising scrubbing said gaseous mixture under superatmospheric pressure at a temperature below 0° C. with a scrubbing medium capable of absorbing said $H_2S$-containing sour gas, heating resultant loaded scrubbing medium in a heat exchanger, and expanding resultant loaded scrubbing medium to liberate the $H_2S$-containing sour gas and regenerate the scrubbing agent, wherein in the absence of a preventive measure, said heat exchanger is fouled by heavy metal sulfides.

It is known that the fouling of apparatus with metallic sulfides during the processing of CO-containing cracked gases produced by the gasification of solid or liquid fuels with steam and oxygen under elevated pressure and temperature is a severe problem. It has also been recognized that this problem is, in the final analysis, due to gaseous metal carbonyls formed during the course of processing of the cracked gases, which carbonyls have the tendency to form sulfides with sulfur compounds present in the cracked gas or in other compounds used in the process; these sulfides, in turn, are deposited on certain parts of the apparatus and clog same during the course of time.

In the production of industrial gases, the acidic components, such as, for example, $CO_2$, $H_2S$, and COS, and collectively termed sour gas must be removed from the gaseous mixtures. This is advantageously accomplished by scrubbing with physical scrubbing media, e.g., alcohols, glycols, or ethers. The methanol scrubbing process proved to be especially advantageous, wherein the sour gas components are separated at temperatures of down to below −70° C. and under high pressure (up to 80 bar). For regeneration, the scrubbing medium, after absorption of the sour gases and the methanol soluble metal carbonyls, is expanded, treated with stripping gas, or heated in heat exchangers. During this procedure, the metal carbonyls decompose into CO and reactive heavy metals, the latter, in turn, forming metallic sulfides with the $H_2S$ present, whereby obstructions occur at various locations in the apparatus.

To prevent such fouling of the apparatus, U.S. Pat. No. 4,142,875 for example, proposes to precipitate heavy metal compounds, which would normally cake in the degasification column, prior to entrance of the solution into this column by heating at least part of the scrubbing solution to 70°–250° C. under a pressure higher than the vapor pressure of the scrubbing liquid and with a residence time of at least 0.25 hour, in a preliminary reactor which can be filled with a packing material.

The deposits, however, can also occur within the heat exchangers used for heating the scrubbing medium from a temperature of, e.g., −40° to +90° C., especially −20° to +80° C. prior expansion. The latter occurrence is especially disadvantageous, since the removal of these deposits from the heat exchangers is very difficult.

SUMMARY

An object of the present invention is to provide at least one improved process of the type described above so as to reduce, if not eliminate deposits of metallic sulfides on the apparatus, particularly in the heat exchanger.

Upon further study of the specification and appended claims, further objects and advantages of this invention will become apparent to those skilled in the art.

To attain these objects, the CO partial pressure in the scrubbing medium is increased to above the partial pressure of the CO in equilibrium with the heavy metal carbonyl in the scrubbing medium during the heating of the loaded scrubbing medium. In this way, carbonyl decomposition is avoided. The equilibrium partial pressure depends, inter alia, on the type of carbonyls present (e.g. nickel or iron carbonyls), on the pressure of the components, on the concentration of the metal carbonyls, and on the temperature.

According to the thermodynamic equilibrium of ideal solutions the following relation is valid $$\Sigma v_i \cdot \mu_i = 0,$$
$$\mu_i = \mu^* + RT \ln x_i$$

wherein
 $\mu$ = chemical potential
 $x_i$ = concentration in mol-fraction of the component i in the liquid phase
 $v_i$ = stochiometric coefficient For $Ni(CO)_4$ in methanol the following relation is valid:

$$\mu_{NiS} + 4 \cdot \mu^*_{CO} + \mu^*_{H_2} - \mu^*_{H_2S} - \mu_{Ni(CO)_4} +$$

$$RT \ln \frac{x_{CO}^4 \cdot x_{H_2}}{x_{H_2S} \cdot x_{Ni(CO)_4}} = 0.$$

In a simplified formula this relation can be written $$\frac{x_{CO}^4 \cdot x_{H_2}}{x_{H_2S} \cdot x_{Ni(CO)_4}} = f(t) - K_x \longrightarrow x_{Ni(CO)_4} = \frac{x_{CO}^4 \cdot x_{H_2}}{x_{H_2S} \cdot K_x}$$

$K_x$ is a factor depending on temperature and increases with higher temperatures. In order to prevent the decomposition of $Ni(CO)_4$, the concentration of CO in the liquid phase has to be increased. As Henry's law is still valid in this temperature and pressure range, $x_{CO}$ is proportional to the CO partial pressure in the gas phase.

In practice it is necessary to correct the $x_i$ by the activity-coefficient, which can vary between 0 and 1.

In addition to the thermodynamic equilibrium a chemical dependency due to the presence of water and other trace components as HCN and $NH_3$ can influence the decomposition of carbonyls.

Gaseous metal carbonyls are soluble in many organic scrubbing media. Therefore, they are scrubbed out together with the sour gases to be removed. During the heating of the loaded scrubbing medium, the solubility of the gaseous carbonyl decreases, whereby the partial pressure increases with a given concentration. Carbonyls have the tendency to decompose into reactive heavy metal and CO at an elevated temperature. The temperature, at which carbonyls decompose, depends on the concentration of carbonyl in methanol and mainly on the concentration of CO in the methanol, which is defined by Henry's law. The concentration of CO is lowered with increasing temperature. Therefore, above a certain temperature, which is defined by the absorbed components, the carbonyls will begin to decompose forming CO and reactive metals. The thus-formed, reactive heavy metal then readily reacts with the hydrogen sulfide contained in the scrubbing medium, with the formation of metal sulfides and free hydrogen. It was heretofore considered that the rate of reaction of the decomposition of heavy metal carbonyls was so rapid at an elevated temperature that equilibrium criteria did not affect decomposition at such temperatures.

After precipitations had been observed in a heat exchanger during heating of the loaded scrubbing medium, the starting temperature in this heat exchanger having been about 0° C., in contrast to the statements in U.S. Pat. No. 4,142,875, tests have been begun. Surprisingly, they have now shown that the decomposition of the carbonyls can be affected at such temperatures by the CO partial pressure. It has been discovered, in this connection, that the heavy metal carbonyls are stable under increased CO partial pressure. Therefore, care must be taken that sufficient CO is present during the heating of the loaded scrubbing medium to prevent carbonyl decomposition within the heat exchangers. If, in contrast, the CO partial pressure above the carbonyl-loaded scrubbing liquid is lowered, the carbonyl can decompose. This is achieved most simply by pressure reduction.

To raise the CO partial pressure during the heating of the loaded scrubbing medium, two measures are preferred. Thus, it is possible to inject into the loaded scrubbing medium, upstream of the heat exchangers, CO-rich gas, for example, also pure CO. The CO concentration of the CO rich gas has to be at least so high that the partial pressure of CO within the heat exchanger is always higher than the decomposition pressure of the carbonyls according to the given temperature and carbonyl concentration in the solvent. Therefore, pure CO or even feedgas with approximately 50% of CO can be used, if the total pressure is high enough. In this way metallic sulfide obstructions are not formed in the heat exchangers. After passing through heat exchangers, the loaded scrubbing medium can then be expanded to below the equilibrium partial pressure, thus decomposing the carbonyls to precipitate out metallic sulfides which can then be physically separated from the scrubbing medium. The metal sulfide-free scrubbing medium may then be conducted to a regenerating column, where degasification gas, if used upstream, can be withdrawn. In this connection, the degasification gas may be conducted to an enrichment column or may be admixed to the raw gas after recompression. Thereby the CO loss can be reduced, and simultaneously a reduction of the $H_2S$ concentration in the gas to the Claus plant can be avoided as well. According to a preferred embodiment of the process of this invention, the scrubbing medium, prior to being expanded to below the equilibrium partial pressure, is conducted to another expansion vessel wherein it is expanded to a CO partial pressure above the equilibrium partial pressure, and the thus-liberated CO-rich flash gas is injected into the loaded scrubbing medium upstream of the heat exchangers. This embodiment offers the advantage that the CO can be recirculated, and only losses need to be replaced by fresh CO, which results in a cost reduction.

As an alternative to the introduction of CO into the loaded scrubbing medium for raising the CO partial pressure, it is also possible to expand the high pressure loaded scrubbing medium coming from the scrubbing column only to such an extent that the CO partial pressure before heating in the heat exchanger lies above the equilibrium partial pressure of the CO in the scrubbing medium. The gas liberated during expansion can be introduced into the raw gas. After heating in the heat exchanger, the scrubbing medium is preferably expanded to a pressure above the CO partial pressure in the scrubbing medium, and the thus-released flash gases are likewise admixed to the raw gas. Thereafter the scrubbing medium is expanded to a pressure below the CO partial pressure so that metallic sulfides can form, which are then separated. The flash gases can likewise be introduced into the raw gas.

BRIEF DESCRIPTION OF THE DRAWINGS

The process of this invention will be explained in greater detail below with reference to the schematically illustrated preferred embodiments in the three figures, to wit.

DETAILED DESCRIPTION

Figure 1:
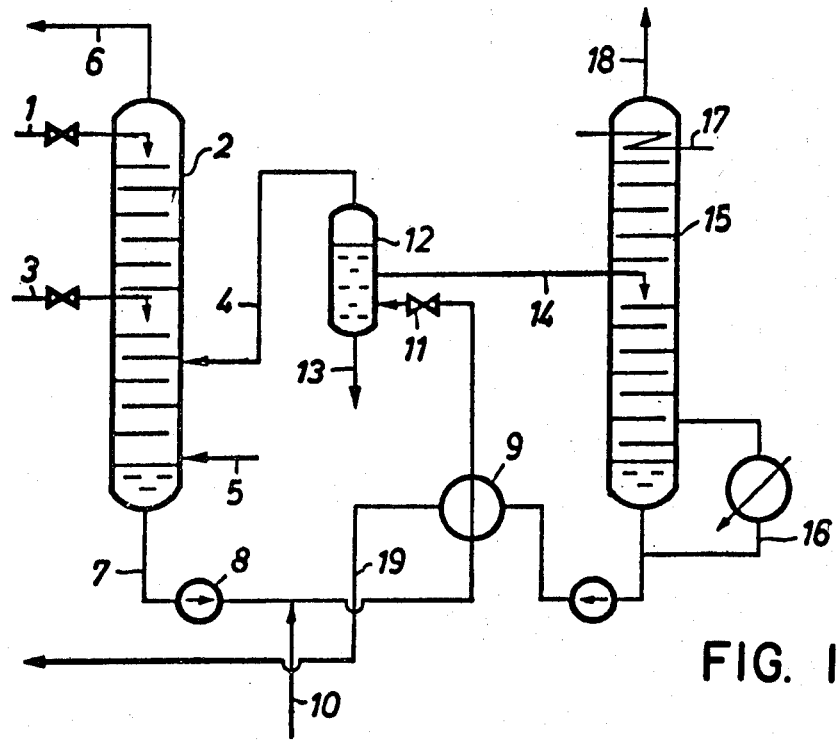
FIG. 1 is an embodiment according to this invention with CO feed.

According to FIG. 1, scrubbing medium, for example methanol, loaded with $CO_2$, passes via a conduit 1 from a scrubbing column (not shown) at a temperature of about $-40°$ C. and under a pressure of 70 bar, into the upper section of an enrichment column 2, while, via conduit 3, methanol loaded with $H_2S$ is introduced, at the same temperature and the same pressure, from the $H_2S$ section of the scrubbing column to the center of the enrichment column 2. Due to a very high $CO_2$ content in the raw gas, e.g. 25 to 45% by volume, this enrichment column is highly desirable. The scrubbing methanol contains additionally $H_2$, CO, small amounts of methane, as well as metal carbonyls, such as $Ni(CO)_4$ and $Fe(CO)_5$. By way of conduit 4, degasification gas, i.e. gas desorbed by heating and expanding the scrubbing medium, is fed to the enrichment column, as explained below. Utilizing an inert gas introduced to the bottom of column 2 via conduit 5, for example nitrogen, the methanol is stripped of $H_2$, $CH_4$, CO and $CO_2$, which compounds are withdrawn overhead in conduit 6 as residual gas, and are eventually employed, for example, as furnace gas. By scrubbing the $H_2S$ at the head of the column with $H_2S$-free methanol, the residual gas is almost free of $H_2S$, thereby enriching the scrubbing medium in $H_2S$ relative to $CO_2$.

The $H_2S$-containing methanol, still containing $CO_2$ as well as the metal carbonyls, is withdrawn from the sump of column 2 and conducted via conduit 7 by pump 8 through heat exchangers 9 (only one of which is illustrated so as not to obscure the drawing), in order to heat the methanol to about 80°. In this heat exchanger, the danger of metal sulfide formation exists due to thermal decomposition of the carbonyls into reactive heavy metals and CO, thereby permitting the heavy metals then to react with the $H_2S$. The resultant metal sulfides, in turn, lead to deposits which foul the heat exchangers in a short period of time. The time required for the fouling and clogging of a heat exchanger depends on the concentration of heavy carbonyl in the loaded methanol and ranges between 4 and 18 months.

For this reason, according to the invention, CO-rich gas, i.e. a gas having at least 50, preferably at least 75 volume % CO, or even pure CO, if available, is injected into the loaded scrubbing methanol via conduit 10, in such an amount that the CO partial pressure is increased above the CO partial pressure in equilibrium with the metal carbonyls in the scrubbing medium. This equilibrium pressure is dependent on the type of metal carbonyls, their concentration, the total pressure of the components, and the temperature, and can be determined by chemical engineering calculations, and corroborated by routine experimentation. By virtue of this pressure increase, substantially no metal carbonyl decomposition occurs, thereby preventing the formation of metal sulfide in the heat exchanger 9.

The resultant CO-enriched heated methanol scrubbing medium is then expanded through valve 11 downstream of heat exchanger 9, to a pressure below the CO equilibrium partial pressure of the scrubbing medium, and is then conducted to the bottom portion of phase separator 12. Owing to the expansion, the metal carbonyls are decomposed into reactive heavy metals and CO, and the heavy metals then can combine with the hydrogen sulfide present in the methanol to form metal sulfides and elemental hydrogen. These metal sulfides are deposited and form a "sludge" which is withdrawn via conduit 13. The sludge is retained, for example, on a filter plate so that the scrubbing methanol, now free of metal sulfide, can be withdrawn via conduit 14 and fed to a regenerating column 15. The phase separator 12 can, alternatively, also be filled with a packing material on which the metal sulfides are deposited. In this case, the packing must be replaced from time to time.

In the regenerating column 15, the hydrogen sulfide in conduit 18 is stripped from the methanol by reboiler heater 16 and a head condenser 17. The hydrogen sulfide obtained during this step is in adequate amounts and purity for utilization in a Claus plant. The regenerated methanol leaves the regenerating column 15 as bottoms via conduit 19 and is recycled to the scrubbing column.

The degasification gases liberated in separator 12, comprising $H_2$, CO and $CO_2$, are withdrawn overhead via conduit 4 and introduced into the enrichment column 2.

Figure 2:
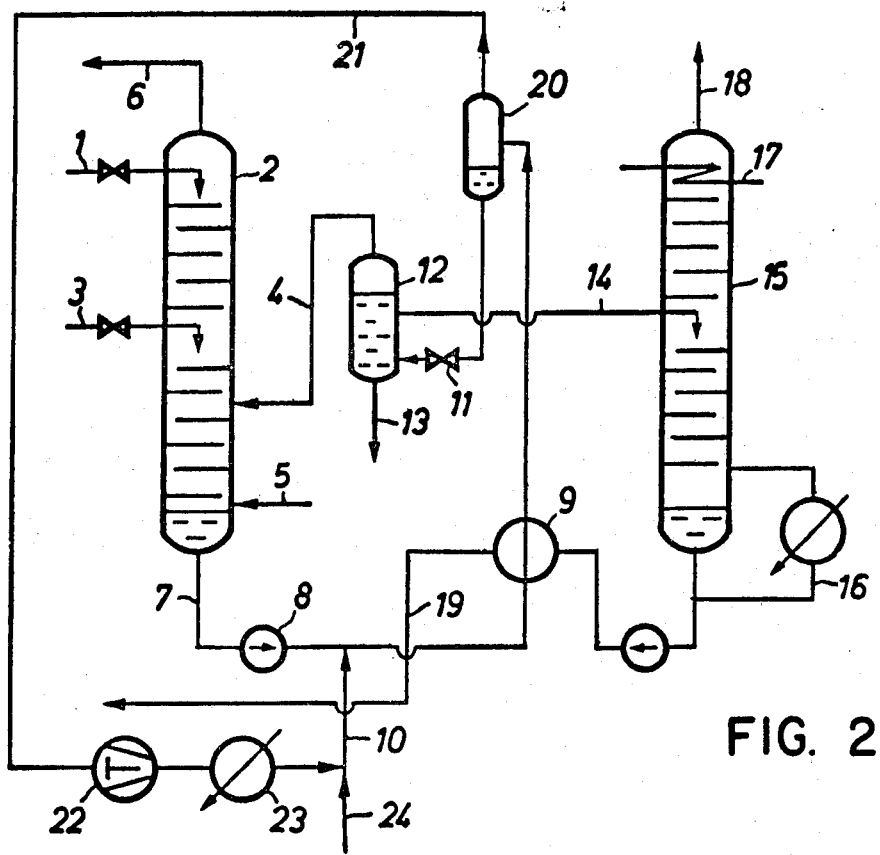
FIG. 2 is an embodiment with CO feed and recycling of the flash gas.

The embodiment of FIG. 2 corresponds essentially to the mode of operation illustrated in FIG. 1, except that in this case the CO-enriched scrubbing methanol is subjected to an expansion at above the equilibrium partial pressure in an expansion vessel 20 after passing through the heat exchangers 9 and before being expanded to below the equilibrium partial pressure. The pressure in this case is expanded only to such an extent that it is above the equilibrium partial pressure of the CO in the scrubbing medium, i.e. so that no carbonyls decompose. During this expansion, a gas is liberated containing about 40% by weight of CO, which is withdrawn via conduit 21, recompressed in 22, cooled in 23, and injected into the loaded scrubbing medium as the CO partial pressure raising gas via conduit 10. By this recirculation of CO-rich gas, only CO losses need to be compensated for via conduit 24, by the addition of, for example, pure CO.

Figure 3:
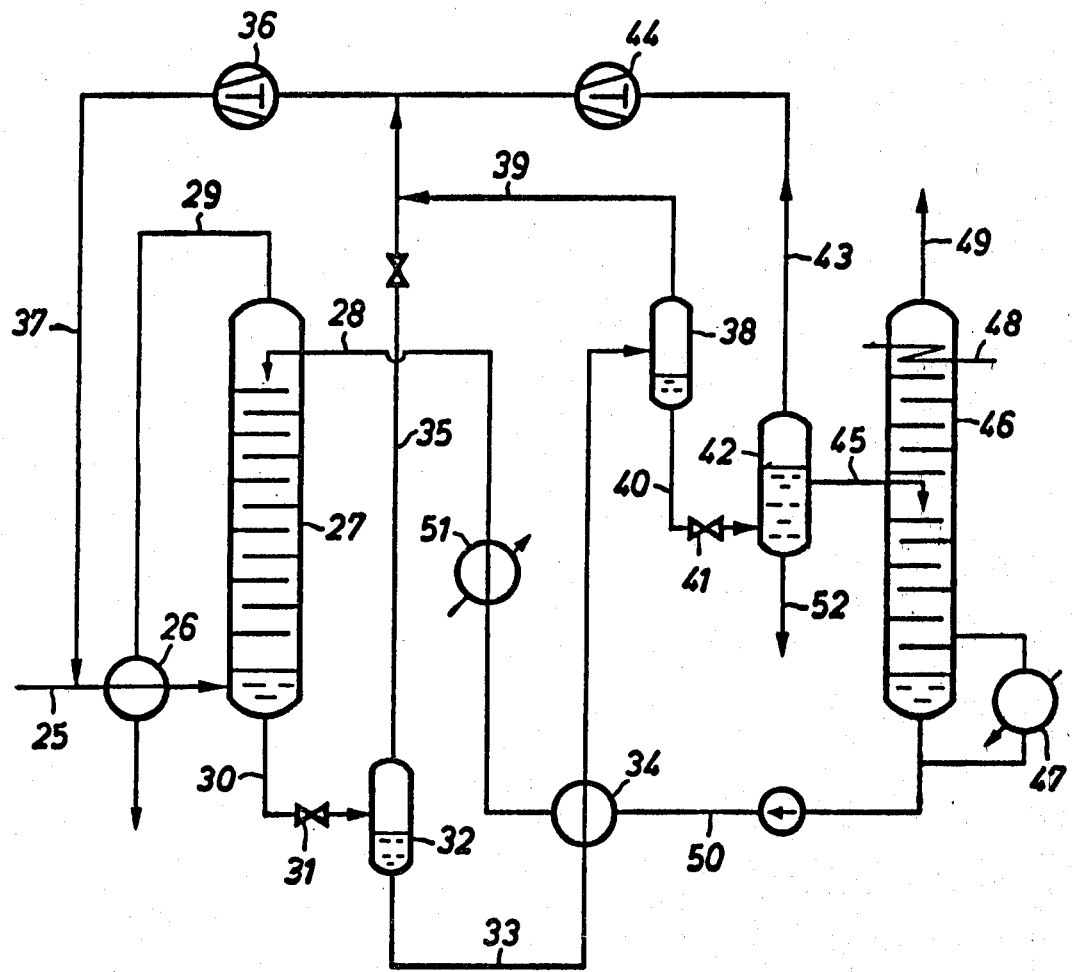
FIG. 3 is an embodiment with partial expansion of the loaded scrubbing medium.

FIG. 3 depicts an alternative embodiment for attaining a CO partial pressure above the CO equilibrium partial pressure in the scrubbing medium, wherein the scrubbing medium, which is under pressure, is only partially expanded.

Via conduit 25, already cooled CO-containing raw gas from the gasification of fuels passes, after a final cooling step in a heat exchanger 26, into a scrubbing column 27 where the raw gas is treated countercurrently with regenerated methanol introduced to the head of the scrubbing column via conuit 28. In this manner, the sour gases as well as the heavy metal carbonyls are absorbed in the methanol. Via conduit 29, the raw gas is withdrawn from the head of column 27, and, after passing through the heat exchanger 26, is employed in the conventional production of a synthesis gas.

The loaded scrubbing methanol, obtained at a high pressure (for example 40 bar), passes from the sump of the scrubbing column 27 via conduit 30 and an expansion valve 31 into a phase separator 32. In the expansion valve, the scrubbing methanol is expanded only to such a pressure that the CO partial pressure lies above the equilibrium partial pressure of the CO in the scrubbing medium at the highest temperature of the scrubbing medium in the downstream heat exchanger. This prevents the carbonyls present from thermal decomposing while the scrubbing medium is conducted in conduit 33 through the heat exchangers 34. Accordingly, insoluble metal sulfides are not formed and the heat exchanger does not become clogged.

The degasification gases liberated during this expansion and consisting essentially of CO and $CO_4$ are withdrawn overhead from separator 32 via conduit 35, recompressed at 36, and admixed to the raw gas via conduit 37.

The resultant heated scrubbing methanol is expanded, in a further expansion vessel 38, to a pressure still above the equilibrium partial pressure of the CO in the scrubbing medium. Flash gas (degasification gas), which is thus produced (essentially CO and $CO_2$), is withdrawn via conduit 39 and admixed to the degasification gas in conduit 35.

The partially expanded scrubbing methanol is expanded in an expansion valve 41 in conduit 40 to a pressure below the CO equilibrium partial pressure in the scrubbing medium and fed to the bottom portion of separator 42. In this separator, precipitated metal sulfides settle in the form of a "sludge" or, if the separator is filled with packing, precipitate on this packing. To clean the separator, the packing is replaced from time to time, or the "sludge" is withdrawn via a conduit 52. In this connection, an apparatus (not shown) is additionally provided for retaining the sludge in the separator 42. The liberated degasification gas (CO, $H_2$ and $CO_2$) is withdrawn via conduit 43, recompressed in 44, and admixed to the other degasification gases.

The scrubbing methanol, now containing merely $H_2S$ as the impurity, is introduced via conduit 45 to the center of a regenerating column 46 wherein it is thermally stripped of $H_2S$ by heating with reboiler 47 and by providing reflux with head condenser 48. The $H_2S$ fraction thus obtained via conduit 49 is suitable for feed to a Claus plant.

The regenerated methanol is withdrawn from the sump of column 46, cooled in heat exchanger 34 against loaded methanol to be heated, cooled by means of external refrigeration in a cooler 51 down to the scrubbing temperature (about $-30°$ C.), and introduced into the scrubbing column 27.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1 (CO FEED)

Owing to a very high $CO_2$ content in a raw gas composed of

| $H_2$ | 6,9% of weight |
|---|---|
| CO | 11,3% of weight |
| $N_2$ + Ar | 0,6% of weight |
| $CO_2$ | 79,3% of weight |
| $H_2S$ | 1,9% of weight |
| $Ni(CO)_4$ + $Fe(CO)_5$ | 2 ppm of weight. | an enrichment column is provided wherein a large fraction of the dissolved $CO_2$ is stripped out of the methanol at low temperatures with the aid of an inert gas. The methanol removed from the sump of the column contains the entire $H_2S$ introduced with the raw gas, and not more than such an amount of $CO_2$ that, after thermal removal of the dissolved gases, a gaseous fraction of at least 26% $H_2S$ is obtained. During the stripping off of $CO_2$, the entire CO is likewise driven out. Carbonyls introduced with the raw gas are dissolved in the methanol and cannot be evolved in the enrichment column since their solubility is higher than that of $CO_2$.

By the addition of 5 $Nm^3$ CO/t loaded methanol upstream of the heat exchanger, such a high CO partial pressure is produced in the methanol that the dissolved carbonyls do not decompose even after heating the methanol to 80° C. The amount of CO added depends in this connection, on the loading of the methanol with $H_2S$ and $CO_2$, as well as on the type of dissolved carbonyls, since the tendency toward decomposition varies in the different carbonyls.

EXAMPLE 2 (PARTIAL EXPANSION OF SCRUBBING MEDIUM)

A CO-rich raw gas composed of

| $H_2$ | 5% of weight |
|---|---|
| CO | 75% of weight |
| $N_2$ + Ar | 1% of weight |
| $CO_2$ | 16% of weight |
| $H_2S$ | 3% of weight |
| $Ni(CO)_4$ + $Fe(CO)_5$ | 8 ppm of weight | is scrubbed with cold methanol in the scrubbing column under a pressure of 60 bar and thus cleansed of $H_2S$, COS, and a portion of the $CO_2$. After intermediate expansion to 21 bar wherein the primary amount of dissolved $H_2$ is liberated, the following compounds are dissolved per ton of methanol:

| $H_2$ | 0.5 $Nm^3/t$ |
|---|---|
| CO | 3.7 $Nm^3/t$ |
| $CO_2$ + $H_2S$ | 54.5 $Nm^3/t$ |
| Heavy Metal Carbonyl | 0,01 kg/t. |

Upon heating the methanol in the heat exchanger to 80° C. under a pressure of 21 bar, a partial degasification of the dissolved gases occurs. The thus-obtained gaseous phase consists of:

| $H_2$ | 3.4 mol - % |
|---|---|
| CO | 18.3 mol - % |
| $CO_2$ + $H_2S$ | 59.1 mol - % |
| $CH_3OH$ | 19.2 mol - % |
| Heavy Metal Carbonyl | less than 1 ppm by vol. |

The CO partial pressure of 3.8 bar is adequate to prevent decomposition of the carbonyls within the heat exchangers.

The pressure during the first intermediate expansion is dependent on the type of carbonyls, their concentration, the pressure of the components, and the temperature, and must be adapted in correspondence with the raw gas analysis.

The preceding examples can be repeated with similar success by substituting the generically or specifically described reactants and/or operating conditions of this invention for those used in the preceding examples.

The above-mentioned invention can be used for all acid gas absorption systems, by which heavy metal carbonyls are absorbed within the absorber. The composition of the feedgas depends on the type of feedstock and the type of gasification. As the content of heavy metals in the feedstock depends on the origin of the feedstock, it covers a wide range of concentration and composition. The concentration of carbonyls in the feedgas entering the acid gas scrubbing unit is influenced not only by the concentration of metals in the feedstock, but also by the upstream processing steps, as e.g. shift conversion. At the same time, the operating pressure of the acid gas removal system depends on the type of gasification and the further use of the purified gas, while the normal working temperature depends on the used solvent.

In general, the invention is preferably used for gases with a higher carbonyl content, as the fouling of equipment and time of clogging depends on the amount of introduced carbonyls. But even with carbonyl concentrations of less than one ppm of weight a substantial deterioration of the effectivity of the plant is expected, if the carbonyl problem is not solved.

For reference purposes in connection with acid gas removal it is hereby referred to "Linde Reports on Science and Technology" No. 18/1973.

From the foregoing description, one skilled in the art can easily ascertain the essential characteristics of this invention, and without departing from the spirit and scope thereof, can make various changes and modifications of the invention to adapt it to various usages and conditions.

We claim:

1. In an absorption process for the removal of $H_2S$-containing sour gas from a raw gaseous mixture containing carbon monoxide and at least one heavy metal carbonyl, said process comprising scrubbing said gaseous mixture under superatmospheric pressure at a temperature of below 0° C. with a scrubbing medium capable of absorbing said $H_2S$-containing sour gas, heating resultant loaded scrubbing medium in a heat exchanger, and expanding resultant loaded scrubbing medium to liberate the $H_2S$-containing sour gas and regenerate the scrubbing agent, wherein in the absence of a preventive measure, said heat exchanger is fouled by heavy metal sulfides, the improvement which comprises raising the CO partial pressure, during the heating of the loaded scrubbing medium in said heat exchanger, to above the partial pressure of the CO in equilibrium with the heavy metal carbonyl in the scrubbing medium to avoid decomposition of heavy metal carbonyl into reactive heavy metal and CO, thereby preventing the formation of heavy metal sulfide from the reaction of reactive heavy metal with $H_2S$.

2. A process according to claim 1, wherein to raise the CO partial pressure, CO-rich gas is injected into the loaded scrubbing medium upstream of the heat exchangers.

3. A process according to claim 2, wherein pure CO is injected into the loaded scrubbing medium.

4. A process according to claim 2, further comprising expanding the loaded scrubbing medium after the latter has passed through the heat exchanger, to a pressure below the equilibrium partial pressure so as to decompose the metal carbonyl and precipitate heavy metal sulfides while releasing a CO and $H_2$-containing degasification gas; and physically separating the precipitated heavy metal sulfides and the degasification gas from the scrubbing medium.

5. A process according to claim 4, further comprising introducing the degasification gas into an enrichment column for increasing the concentration of $H_2S$ in the scrubbing medium relative to $CO_2$.

6. A process according to claim 4, further comprising compressing the degasification gas and admixing same with the raw gas.

7. A process according to claim 4, further comprising conducting the scrubbing medium, prior to said expansion to a pressure below the equilibrium partial pressure, to a further expansion vessel, and expanding said scrubbing medium to a pressure above the equilibrium partial pressure, and injecting resultant released flash gas into the loaded scrubbing medium upstream of the heat exchanger.

8. A process according to claim 1, wherein the loaded scrubbing medium from the scrubbing column is expanded only to such an extent that the CO partial pressure prior to the heating in the heat exchanger, remains above the equilibrium partial pressure of the CO in the scrubbing medium at the warmest point of the heating step.

9. A process according to claim 8, wherein the gas liberated by the expansion is recycled into the raw gas.

10. A process according to claim 9, further comprising further expanding the liquid scrubbing medium remaining after said expansion, after said heating in the heat exchanger, to a lower pressure but still above the CO equilibrium partial pressure and the thus-produced flash gas is admixed with the raw gas.

11. A process according to claim 10, further comprising further expanding the scrubbing liquid remaining after the expansion to said lower pressure, to a pressure below the CO equilibrium partial pressure to decompose the heavy metal carbonyl and precipitate heavy metal sulfies and form a degasification gas; and separating the scrubbing medium from the degasification gas and the precipitate, and then thermally regenerating resultant scrubbing medium to form an $H_2S$-containing gas and regenerated scrubbing medium.

12. A process according to claim 11, further comprising admixing the degasification gas with the raw gas.

* * * * *